United States Patent [19]

Park

[11] Patent Number: 5,493,938

[45] Date of Patent: Feb. 27, 1996

[54] TRANSMISSION FOR HEAVY CONSTRUCTION EQUIPMENT

[75] Inventor: Seong-Yoon Park, Pusan, Japan

[73] Assignee: Samsung Heavy Industry Co., Ltd., Seoul, Rep. of Korea

[21] Appl. No.: 241,870

[22] Filed: May 12, 1994

[30] Foreign Application Priority Data

Jun. 30, 1993 [KR] Rep. of Korea ..................... 93-12145

[51] Int. Cl.$^6$ ................................. F16H 47/00
[52] U.S. Cl. ........................ 74/733.1; 477/68; 74/730.1
[58] Field of Search .................. 74/730.1, 732.1, 74/733.1; 477/52, 68, 70

[56] References Cited

U.S. PATENT DOCUMENTS

| | | | |
|---|---|---|---|
| 4,186,739 | 2/1980 | Hamma et al. | 477/68 X |
| 4,620,560 | 11/1986 | Countant | 74/733.1 X |
| 5,101,627 | 4/1992 | Fujh et al. | 60/429 |
| 5,111,716 | 5/1992 | Sato et al. | 74/733.1 |

FOREIGN PATENT DOCUMENTS

| | | | |
|---|---|---|---|
| 3738794 | 5/1989 | Germany | 74/730.1 |
| 404004350 | 1/1992 | Japan | 74/730.1 |

*Primary Examiner*—Khoi Q. Ta
*Attorney, Agent, or Firm*—Lieberman & Nowak

[57] ABSTRACT

A transmission for a heavy construction equipment such as a wheel type excavator adopting the hydrostatic drive system for transmitting travelling power. The transmission applied to a heavy construction equipment having an upper turning body, a lower travelling body and a turning joint for coupling the upper turning body to the lower travelling body so as to turn the upper turning body with respect to the lower travelling body and having a gear box disposed in the lower travelling body and provided with clutches for at least two speed change stages, and a control unit disposed in the upper turning body, a charging pump disposed in the upper turning body, a power shift motor disposed in the lower travelling body and adapted to be actuated by an oil fed from the charging pump, and a power shift pump disposed in the lower travelling body and adapted to be actuated by the power shift motor, with the gear box performing a speed change operation by oil fed from the power shift pump.

1 Claim, 2 Drawing Sheets

5,493,938

TRANSMISSION FOR HEAVY CONSTRUCTION EQUIPMENT

BACKGROUND OF THE INVENTION

1. Field of the Invention

The present invention relates to a transmission for a heavy construction equipment, and more particularly to a transmission for a heavy construction equipment such as a wheel type excavator adopting the hydrostatic drive system as means for transmitting travelling power.

2. Description of the Prior Art

A typical transmission for a heavy construction equipment such as a wheel type excavator is illustrated in FIG. 1. As shown in the drawing, the transmission includes a gear box 111 disposed in a lower travelling body of the heavy construction equipment and a controller 105 disposed in an upper turning body of the heavy construction equipment. The upper turning body is coupled to the lower travelling body by means of a turning joint 112 so that it can turn through a desired angle with respect to the lower travelling body.

The controller 105 includes a pilot pump 101 adapted to supply oil for a gear shifting for a speed change and a lubrication, a pressure control valve 102 communicated with the pilot pump 101 and adapted to control pressure of the oil, and a solenoid value 104 communicated with the pressure control valve 102 and adapted to switch oil path communication between the pilot pump 101 and the gear box 111 in accordance with an electrically switching manipulation of a gear shifting lever 103.

The gear box 111 includes a pair of different-stage cylinders 106 and 107 actuated by the oil path communication obtained by the solenoid valve 104, a gear shifting valve 108 provided with oil paths respectively communicated with the cylinders 106 and 107 and adapted to perform a switching operation for selectively opening and closing the oil paths, and a pair of different-stage clutches 109 and 110 both communicated with the gear shifting valve 108 and actuated by the oil path communication switching operation of the gear shifting valve 108.

Although not shown, the turning joint 112 has various oil paths respectively adapted to supply oil pressure from a hydraulic pump equipped in the lower travelling body to various working units such as a boom of the upper turning body or a dipper stick.

Since various oil paths pass through the turning joint 112 as a moving part in the above-mentioned conventional transmission, damage of the turning joint 112 which occurs relatively frequently results in oil leakage from oil paths and thereby loss of pressurized oil.

In the conventional transmission, the oil paths extending from the hydraulic pump equipped in the gear box 111 as an oil pressure supply source respectively to the cylinders 106 and 107 are relatively long. Due to such a long oil path length, a considerably high frictional resistance occurs in the oil paths, thereby resulting in a degradation in pressure stability characteristic of the clutches 109 and 110.

When the pressure of oil applied to the clutch 109 or the clutch 110 is decreased due to the loss of pressurized oil or the degraded pressure stability characteristic, adjacent discs of the clutch in question rotate while being in insufficient contact with each other. As a result, a slippage occurs between the discs being in contact with each other, thereby causing severe frictional heat to be generated. Such a severe frictional heat results in damage and early worn-out of the clutch.

Where the oil paths passing through the turning joint 112 are damaged due to the damage of the turning joint 112, the pressurized oil supplied to the cylinders 106 and 107 for the gear shifting may be mixed with the oil for lubrication or the pressurized oil for actuating the working unit. In this case, the overall hydraulic system may be adversely affected to a considerable extent.

SUMMARY OF THE INVENTION

Therefore, an object of tile invention is to eliminate the above-mentioned problems encountered in the prior art and, thus, to provide a transmission for a heavy construction equipment capable of achieving an improved speed change performance and a lengthened life, and an enhanced durability.

In accordance with the present invention, this object can be accomplished by providing a transmission for a heavy construction equipment having an upper turning body, a lower travelling body and a turning joint for coupling the upper turning body to the lower travelling body so as to turn the upper turning body with respect to the lower travelling body, comprising a gear box disposed in the lower travelling body and provided with clutches for at least two speed change stages, and a control unit disposed in the upper turning body, the transmission further comprising: a charging pump disposed in the upper turning body; a power shift motor disposed in the lower travelling body and adapted to be actuated by an oil fed from the charging pump; and a power shift pump disposed in the lower travelling body and adapted to be actuated by the power shift motor, whereby the gear box performs a speed change operation by an oil fed from the power shift pump.

BRIEF DESCRIPTION OF THE DRAWINGS

These and other objects, features and advantages of the invention will become more apparent upon a reading of the following detailed specification and drawings, in which.

DETAILED DESCRIPTION OF THE PREFERRED EMBODIMENTS

Figure 1:
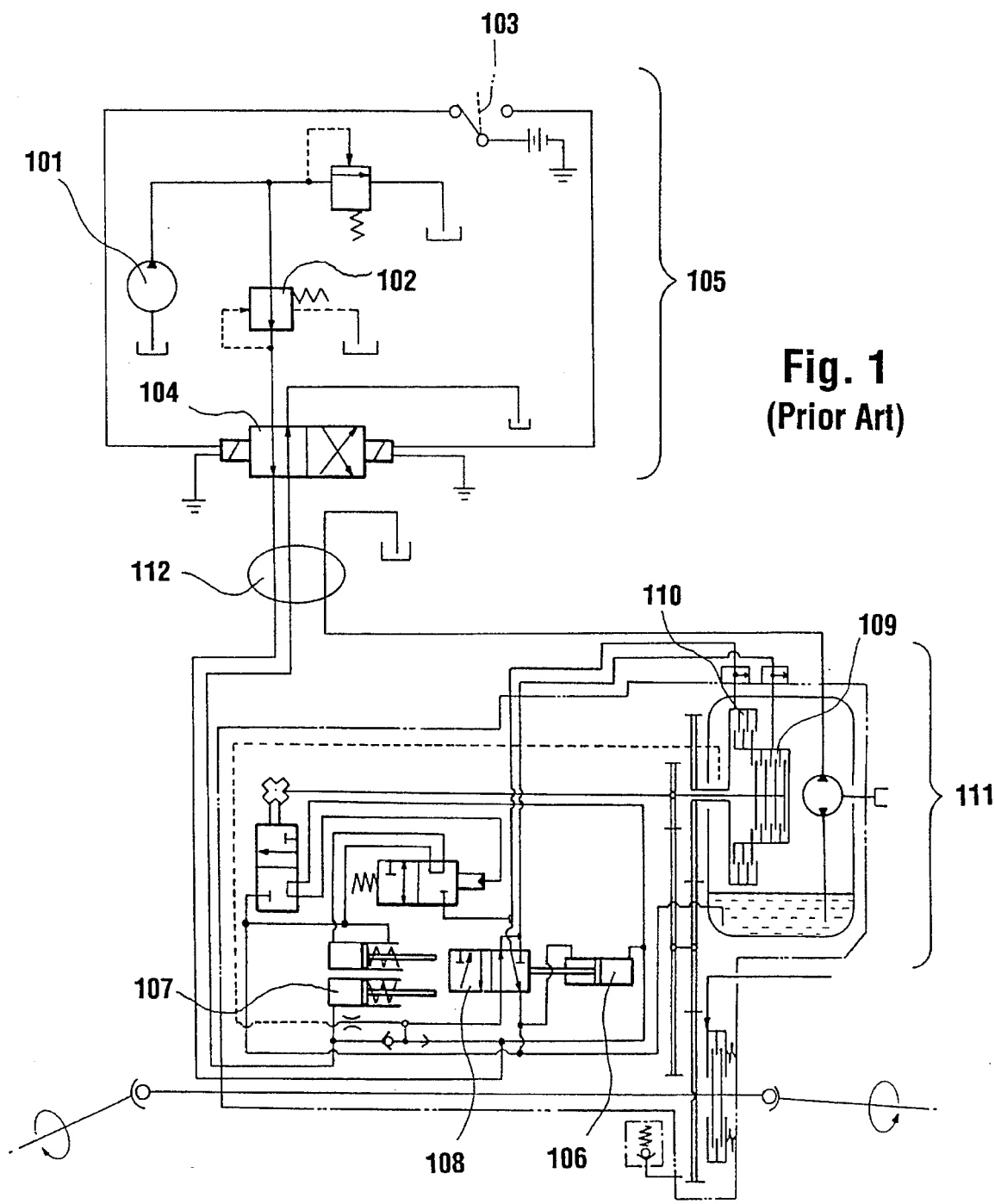
FIG. 1 is a diagram illustrating a hydraulic circuit of a conventional transmission for an excavator.
Figure 2:
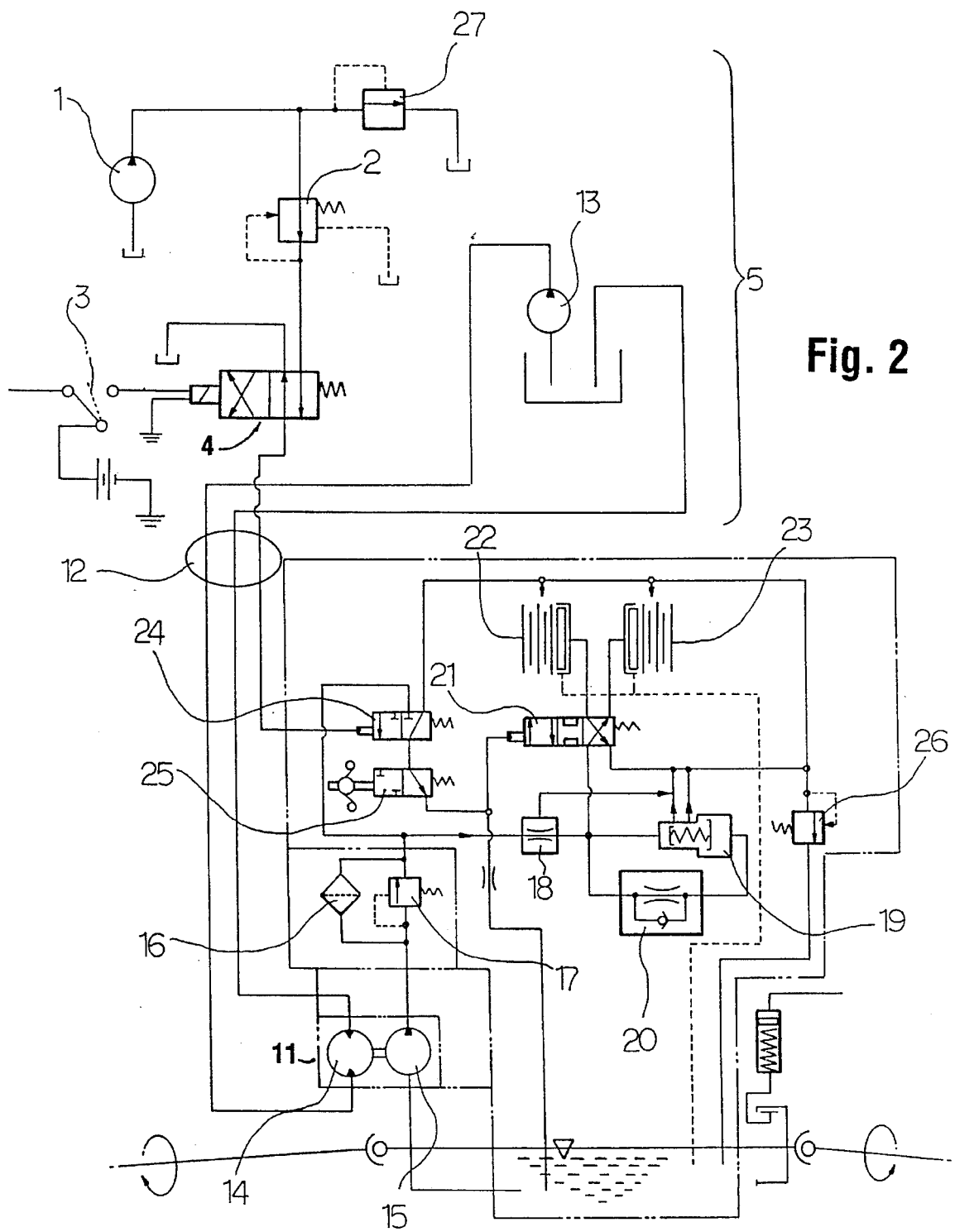
FIG. 2 is a diagram illustrating a hydraulic circuit of a transmission for an excavator in accordance with an embodiment of the present invention.

FIG. 2 is a diagram illustrating a hydraulic circuit of a transmission for a heavy construction equipment in accordance with an embodiment of the present invention.

As shown in FIG. 2, the transmission of the present invention includes a gear box 11 disposed in a lower travelling body (not shown) of the heavy construction equipment and a control unit 5 disposed in an upper turning body (not shown) of the heavy construction equipment. The upper turning body is coupled to the lower travelling body by means of a turning joint 12 so that it can turn through a desired angle with respect to the lower travelling body.

The control unit 5 includes basically a pilot pump 1, a pressure control valve 2 adapted to control pressure of an oil discharged from the pilot pump 1, and a solenoid valve 104 communicated with the pressure control valve 2 and adapted to switch oil path communication between the pilot pump 1 and the gear box 11 in accordance with an electrically switching manipulation of a gear shifting lever 3. In additional, the control unit 5 further includes a charging pump 13 for actuating a power shift motor 14 equipped in the lower travelling body. The power shift motor 14 will be described, hereinafter.

The gear box 11 includes a power shift pump 15 driven by the power shift motor 14. Communicated to the power shift pump 15 are a modulation valve 19, a gear shifting valve 21, and a pilot valve 24. In the oil path communicating the valves 19, 21 and 24 to the power shift pump 15, an oil filter 16 and a relief valve 17 are disposed. The oil filter 16 serves to filter impurities included in an oil passing through the oil path whereas the relief valve 17 serves to allow the oil to bypass the oil filter 16 when the oil filter 16 does not perform its own function.

The gear shifting valve 21 applies the oil discharged from the power shift pump 15 selectively to a primary-stage clutch 22 and a secondary-stage clutch 23 so that it can carry out a switching operation for a selected oil path communication for a desired speed change. The modulation valve 19 serves to controllably feed a lubrication oil to the clutches 22 and 23. When the lubrication oil fed to the clutches 22 and 23 is subjected to a sudden pressure increase, the modulation valve 19 relieves the oil pressure to a certain value by its vibration phenomenon so that it can feed the lubrication oil at a reduced rate. The pilot valve 24 has a spool movable in accordance with the oil path communication switching operation of the solenoid valve of the control unit 5. The pilot valve 24 is also communicated with the gear shifting valve 21. With such a construction, as the spool of the pilot valve 24 moves, the spool of the gear shifting valve 21 is correspondingly moved, thereby achieving a desired oil path communication to a selected one of the clutches 22 and 23.

In other words, the speed change by one of the clutches 22 and 23 selected in accordance with the switching operation of the gear shifting valve 21 for a desired oil path communication is accomplished by feeding the oil from the power shifting pump 15 to the selected clutch. On the other hand, the switching operation of the gear shifting valve 21 for the desired oil path communication is accomplished by the oil path communication switching operation of the solenoid valve 4 caused by the manipulation of the gear shifting lever 3. The feed of the lubrication oil to each of the clutches 22 and 23 is accomplished by the function of the modulation valve 19.

In FIG. 2, the reference numeral 25 denotes a down-shift protection valve for inhibiting a shift-down from the secondary one to the primary one until the output from time transmission is decreased to a predetermined RPM so as to prevent an impact from occurring during the shift-down. The reference numeral 18 denotes a flow divider, 20 a check orifice valve, and 26 and 27 relief valves.

Operation of the transmission having the above-mentioned construction will now be described.

First, the description will be made in conjunction with a case wherein the primary clutch is actuated for a primary-stage travel. For the primary-stage travel, the gear shifting lever 3 is first moved to its primary-stage position. By this movement of the gear shifting lever 3, the solenoid valve 4 is actuated such that its spool moves to its right position when viewed in FIG. 2. As a result, oil from the pilot pump 1 is fed to the pilot valve 24 via the solenoid valve 4.

When the power shift pump 15 discharges an oil by a pumping action of the charging pump 13 under the above condition, the discharged oil is fed to the gear shifting valve 21 via the pilot valve 24 and the down-shift protection valve 25 so that the gear shifting valve 21 can move right. By this right movement of the gear shifting valve 21, the oil discharged from the power shift pump 15 is applied to the primary-stage clutch 22 via the gear shifting valve 21, thereby causing the primary-stage clutch 22 to be actuated. That is, adjacent discs of the primary-stage clutch 22 come into contact with each other by the pressure of applied oil.

Where the secondary-stage clutch is to be actuated for a secondary-stage travel, the gear shifting lever 3 is shifted to its secondary-stage position. By this shifting operation, the solenoid valve 4 is actuated again such that its spool moves to its left position, thereby cutting off the feed of oil from the pilot pump 1 to the pilot valve 24, as shown in FIG. 2. If the oil pressure in the oil path between the pilot pump 1 and the solenoid valve 4 is increased above a predetermined level, time oil is fed back to time oil reservoir such as an oil tank through time relief valve 27. Due to the cut-off of the oil to time pilot valve 24, both the spool of the pilot valve 24 and the spool of the gear shifting valve 25 move to their left positions by virtue of resiliences of springs loaded in the valves 24 and 25, respectively.

At the left position of the pilot valve 24, the oil discharged from the power shift pump 15 is applied to the secondary-stage clutch 23 via the flow divider 18 and the gear shifting valve 21 so that adjacent discs of the primary-stage clutch 22 can come into contact with each other by the pressure of applied oil.

During the actuation of each one of the clutches 22 and 23, a part of the oil discharged from the power shift pump 15 is supplied to both the clutches 22 and 23 through the modulation valve 19, irrespective of whether any one of the clutches 22 and 23 is actuated. The modulation valve 19 generates a vibration serves to controllably feed a lubrication oil to the clutches 22 and 23. When the lubrication oil fed to the clutch 22 or the clutch 23 is subjected to a sudden pressure increase, the modulation valve 19 generates a vibration, thereby causing the lubrication oil to be fed at a reduced rate.

In the transmission in accordance with the illustrated embodiment of the present invention, all the oil paths extending from the power shift pump 15 to the clutches 22 and 23 are disposed in the lower travelling body. Accordingly, the total oil path length of the transmission is very short, thereby enabling a decrease in frictional resistance occurring in oil paths. Oil paths passing through the turning joint 12 include only the oil path adapted to feed the oil from the charging pump 13 for actuating the power shift motor 14 and the oil path adapted to feed the oil from the pilot pump 1 for actuating the pilot valve 24. All the remaining oil paths adapted to feed the pressurized oil to the clutches 22 and 23 and the oil paths for the lubrication oil are disposed in the lower traveling body. Where the turning joint 12 is severely damaged, accordingly, it is possible to basically prevent factors of mixing of the pressurized oil and the lubrication oil and an adverse effect caused by the mixture. In accordance with the illustrated embodiment of the present invention, the power shift motor 14 is constructed to generate only its rotation by the oil fed from the charging pump 13. By virtue of such a construction, the oil fed from the power shift pump 15 to each of the clutches 22 and 23 exhibits a very high secondary pressure stability characteristic, even when the pressure of the actuating oil varies between static pressure and dynamic pressure caused by a circulation of the actuating oil. Thus, the transmission of the present invention can maintain a relatively normal operation performance, even when a relatively severe damage occurs in the turning joint.

As apparent from the above description, the present invention provides a transmission for a heavy construction equipment such as a wheel type excavator adopting the hydrostatic drive system as means for transmitting travelling power, capable of achieving an improved speed change performance and a lengthened life, and arm enhanced durability.

Although the preferred embodiments of the invention have been disclosed for illustrative purposes, those skilled in the art will appreciate that various modifications and additions are possible, without departing from the scope and spirit of the invention as disclosed in the accompanying claims.

What is claimed is:

1. A transmission for heavy construction equipment having an upper turning body, a lower traveling body and a turning joint for coupling the upper turning body to the lower traveling body so as to turn the upper turning body with respect to the lower traveling body, comprising:

a control unit disposed in the upper turning body, said control unit comprising a pilot pump, and a solenoid valve switchable between different oil path communication positions and adapted to control the direction of oil discharged from the pilot pump;

a charging pump disposed in the upper turning body;

a power shift motor disposed in the lower traveling body and adapted to be to be actuated by oil fed from the charging pump;

a power shift pump disposed in the lower traveling body and adapted to be actuated by the power shift motor; and a gear box disposed in the lower traveling body and provided with clutches for at least two speed change stages, the gear box performing a speed change operation by means of oil fed from the power shift pump, the gear box having a pilot valve communicating with the power shift pump and provided with a spool movable by the switching operation of the solenoid valve to be switched between different oil path communication positions, a gear shifting valve communicating with the power shift pump and provided with a spool movable by the switching operation of the pilot valve to be switched between different oil path communication positions respectively for feeding the oil discharged from the power shift pump to corresponding ones of the clutches, and a modulation valve communicating with the power shift pump and adapted to feed lubrication oil to the clutches.

* * * * *